(12) United States Patent
Stratmann et al.

(10) Patent No.: US 10,604,183 B2
(45) Date of Patent: Mar. 31, 2020

(54) METHOD FOR STEERING A VEHICLE, CONTROLLER FOR A MOTOR VEHICLE, AND MOTOR VEHICLE

(71) Applicant: ZF Friedrichshafen AG, Friedrichshafen (DE)

(72) Inventors: Julian Stratmann, Melle (DE); Andreas Hartmann, Höltinghausen (DE); Oliver Westphal, Diepholz (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 15/738,808

(22) PCT Filed: May 23, 2016

(86) PCT No.: PCT/EP2016/061531
§ 371 (c)(1),
(2) Date: Dec. 21, 2017

(87) PCT Pub. No.: WO2017/001116
PCT Pub. Date: Jan. 5, 2017

(65) Prior Publication Data
US 2018/0194394 A1    Jul. 12, 2018

(30) Foreign Application Priority Data
Jun. 30, 2015  (DE) ......................... 10 2015 212 229

(51) Int. Cl.
*B62D 7/15*      (2006.01)
*B62D 15/02*     (2006.01)
(Continued)

(52) U.S. Cl.
CPC ............ *B62D 7/159* (2013.01); *B60W 10/08* (2013.01); *B60W 10/184* (2013.01);
(Continued)

(58) Field of Classification Search
CPC ...... B62D 7/159; B62D 15/025; B60W 10/08; B60W 10/184; B60W 10/188;
(Continued)

(56) References Cited

U.S. PATENT DOCUMENTS 6,050,359 A   4/2000  Mouri et al.
6,070,112 A   5/2000  Sato et al.
(Continued)

FOREIGN PATENT DOCUMENTS

DE    42 17 634 C1    7/1993
DE    197 50 377 A1   5/1998
(Continued)

OTHER PUBLICATIONS

German Office Action Corresponding to 10 2015 212 229.8 dated Jan. 18, 2016.
(Continued)

*Primary Examiner* — Aaron L Troost
*Assistant Examiner* — Paula L Schneider
(74) *Attorney, Agent, or Firm* — Davis & Bujold PLLC; Michael J. Bujold

(57) ABSTRACT

A method of steering a vehicle having a front axle steering mechanism and, in particular, a rear axle steering mechanism. It is proposed that interventions are carried out at the rear axle to maintain the vehicle on course, at the same time, interventions are carried out at the front axle steering mechanism to avoid a restoring self-alignment of the front wheels.

10 Claims, 2 Drawing Sheets

(51) Int. Cl.
  *B60W 30/12* (2020.01)
  *B60W 10/08* (2006.01)
  *B60W 10/20* (2006.01)
  *B60W 10/184* (2012.01)
  *B60W 30/02* (2012.01)
  *B60W 10/188* (2012.01)
  *B60W 10/192* (2012.01)
  *B60W 30/045* (2012.01)

(52) U.S. Cl.
  CPC ........ *B60W 10/188* (2013.01); *B60W 10/192* (2013.01); *B60W 10/20* (2013.01); *B60W 30/02* (2013.01); *B60W 30/045* (2013.01); *B60W 30/12* (2013.01); *B62D 15/025* (2013.01); *B60W 2710/083* (2013.01); *B60W 2710/182* (2013.01); *B60W 2720/14* (2013.01); *B60W 2720/406* (2013.01)

(58) Field of Classification Search
  CPC ...... B60W 10/192; B60W 10/20; B60W 3/02; B60W 30/045; B60W 30/12; B60W 2710/083; B60W 2710/182; B60W 2720/14; B60W 2720/406; B60W 30/02; B60W 30/10; B60W 2720/403
  USPC .......................................................... 701/41
  See application file for complete search history.

(56) References Cited

U.S. PATENT DOCUMENTS

| | | | |
|---|---|---|---|
| 8,534,414 B2 | 9/2013 | Williams | |
| 8,903,607 B2 | 12/2014 | Lee et al. | |
| 2007/0225914 A1* | 9/2007 | Kawazoe | B60W 30/12 701/301 |
| 2009/0314568 A1* | 12/2009 | Brown | B62K 5/08 180/209 |

FOREIGN PATENT DOCUMENTS

| | | |
|---|---|---|
| DE | 198 08 100 A1 | 10/1998 |
| DE | 10 2007 037 645 A1 | 2/2009 |
| DE | 10 2007 000 654 A1 | 5/2009 |
| DE | 11 2004 001 258 B4 | 2/2012 |
| DE | 10 2013 200 132 A1 | 7/2013 |
| EP | 2 243 687 A1 | 10/2010 |

OTHER PUBLICATIONS

International Search Report Corresponding to PCT/EP2016/061531 dated Sep. 6, 2016.
Written Opinion Corresponding to PCT/EP2016/061531 dated Sep. 6, 2016.

* cited by examiner

METHOD FOR STEERING A VEHICLE, CONTROLLER FOR A MOTOR VEHICLE, AND MOTOR VEHICLE

This application is a National Stage completion of PCT/EP2016/061531 filed May 23, 2016, which claims priority from German patent application serial no. 10 2015 212 229.8 filed Jun. 30, 2015.

FIELD OF THE INVENTION

The invention concerns a method for steering and controlling a vehicle which has front axle steering means and in particular rear axle steering means.

BACKGROUND OF THE INVENTION

A problem, on which the invention is based, is the correct tracking or direction stabilization of a vehicle, in particular a motor vehicle. To solve that problem so-termed driver assistance systems, in particular tracking assistance systems (lane keeping assistant) have been proposed, which are also used in present-day vehicles. With passive tracking assistance systems, if the driver moves off course he is alerted to the lane departure by visual, acoustic or haptic signals, for example by vibration of the steering wheel or of his seat. With active course maintenance systems a control unit intervenes in the steering of the front axle, i.e. a turn of the steering wheel and the front wheels is produced, which the driver perceives and often senses as unwelcome interference.

SUMMARY OF THE INVENTION

An objective of the present invention is to make the most of further possibilities for the correct tracking or direction stabilization of vehicles.

This objective is achieved by the characteristics specified in the independent claims. Advantageous design features emerge from the subordinate claims.

In the steering system known from DE 11 2004 001 258 B4, it is provided that if one of the two steering mechanisms operates defectively, the defective steering mechanism is disconnected, set to zero (straight-line driving) and only the other, still functional steering mechanism continues being used. For example, if the front axle steering develops a fault it is centered and disconnected, and the vehicle is then only steered by the rear axle steering mechanism.

According to the invention, for correct tracking or maintaining the trajectory or stabilizing the direction of the vehicle, interventions are carried out at the rear axle and to avoid a restoring self-alignment of the front wheels interventions also take place in the front axle steering mechanism.

Interventions at the rear axle mean both the respective or common steering of the rear wheels with a change of the wheel steering angle, and also steering by the selective braking or acceleration of wheels on the rear axle. At any rate the interventions result in a yawing torque about the vertical axis of the vehicle and thus also in a lateral force that acts on the front axle or the front wheels.

Since the front wheels are articulated to the front axle in a caster configuration, a deflection of the rear in one direction produces a lateral force in the opposite direction on the front axle. If the rear wheels are steered backward and outward to the right, owing to their caster configuration the front wheels would tend to align themselves approximately in the same direction as the rear wheels. Because of that the vehicle ultimately travels in a kind of parallel motion (crabwise). The effect of the deviation of the vehicle on the rear axle is reduced. This can be prevented if the wheel steering angle of the front wheels is at least temporarily fixed.

The caster or caster distance is the distance in the longitudinal direction between the track point (the point of intersection of the steering rotational axis and the road surface) and the wheel contact point. The wheel contact point is usually behind the track point in relation to the direction of travel (positive caster), so that the wheel lags behind the steering rotation axis. It therefore turns automatically in the desired direction of travel—as for example when pushing a shopping trolley. Owing to the caster effect, when a steering angle is imposed a restoring torque is produced. When driving round a curve the restoring torque is perceptible in the steering. Together with the transverse acceleration it gives the driver feedback about driving around the curve and about the contact between the tires and the road.

The advantage achieved thereby is that these interventions bring about the correct tracking and are practically not perceived by the driver. In other words, the driver follows the direction or trajectory he has determined by means of the steering wheel (course or travel path of the vehicle) and does not perceive any movement and therefore almost no torque on the steering wheel, as would otherwise be the case with active steering. Rather, the intervention at the rear axle acts to assist the driver and is not felt as interference due to a steering intervention at the front axle. It enables driving with little steering effort and is perceived as comfortable, on-course driving. If a vehicle, at least for an inexperienced driver, oversteers in an uncontrollable manner, the intervention also acts to stabilize the vehicle.

In a preferred variant of the method, the intervention at the rear axle takes place exclusively by changing the wheel steering angle of the rear wheels, i.e. changing the wheel deflection of the rear wheels relative to the road. At least one adjustor or actuator, which brings about the wheel deflection of the rear wheels directly or by way of a track rod, receives from a control unit or control system a corresponding signal and sets the desired rear wheel steering angle. For this, the at least one actuator is coupled in each case to a, or to the wheel carrier on which the respective wheel is mounted, at which the wheel steering angle is to be set.

In a further preferred method variant the intervention takes place by influencing the yaw torque, in that different drive or braking torques act upon the rear wheels.

This can be done for example by increasing the drive torque on at least one rear wheel or by braking at least one rear wheel. An individual distribution of the drive torque, also called Torque Vectoring or Active Yaw Control, is possible by means of an active rear axle differential, which for example comprises specially shiftable clutches for the purpose.

Alternatively to such a rear axle differential, the same effect can be achieved by means of individual wheel drives, for example with electric motors. Thus, individual wheel drives can be provided which are made in single-wheel or compound steered-wheel suspensions.

Alternatively or even additionally, the interventions at the rear wheels are enabled by a driving dynamics regulating system such as ESC/ESP (Electronic Stability Control Program). This enables a selective braking of at least one wheel.

As with ESC/ESP, intervention at the rear axle by means of torque vectoring produces a yawing torque about the vertical axis and has a steering effect on the vehicle by virtue of a controlled redistribution of the wheel torques. The effect of a steering movement of the wheels on the rear axle differs from this. Ultimately, however, a desired or intended steering of the vehicle is possible.

It is known that when the rear wheels are steered or when a yawing torque acts upon the vehicle, the front wheels react in such manner that by virtue of the front axle geometry or the conventional wheel suspension of the front wheels in a caster configuration, the front wheels tend to undergo a restoring self-alignment which opposes the change of the wheel steering angle. As a result, the intervention at the rear axle is not very effective.

Preferably, to avoid the restoring self-alignment of the front wheels an intervention is carried out in the front axle steering mechanism by applying an opposing torque or an opposite force in the front axle steering mechanism, which acts in opposition to a self-aligning restoration of the front wheels and thereby prevents any change of the current steering wheel angle or wheel steering angle.

According to a further preferred embodiment, the intervention in the front axle steering mechanism takes place in such manner that at the front wheels, at least temporarily, the current wheel steering angle is maintained or a wheel steering angle is set. In this way, the restoring self-alignment effect due to the interventions at the rear axle is decoupled from the front wheels or the steering wheel.

However, the method is in any case implemented in such manner that the driver is always able to overrule the at least temporarily maintained wheel steering angle, i.e. to impose another direction on the vehicle.

Ideally, the release from the at least temporary holding position takes place imperceptibly by the driver.

In a further preferred method variant, the intervention at the front axle steering mechanism takes place in that by means of a movement or angular position of the steering wheel and/or steering linkage and/or track rod, the front wheels are adjusted. This gives further options for the type of the intervention, in which additionally or alternatively to the temporary set position, a steering angle change is effected. This change can be a steering angle decrease or increase relative to the existing steering angle, which is applied before or after the temporary setting of the angle.

In a further preferred method variant the intervention at the front axle steering mechanism takes place by means of a superimposed steering system or an electric steering system (steer-by-wire). With a superimposed steering system, which is known and exists in present-day vehicles, the gear ratio between the steering angle or steering wheel command and the actual wheel steering angle at the wheels is changed. In the case of the electric steering system (steer-by-wire), there is no longer any mechanical connection between the steering wheel and the wheels, and as with the superimposed steering system the wheel steering angle can differ from that specified by means of the steering wheel.

Alternatively, the intervention at the front axle steering mechanism can also take place by means of an electromechanical or steering force supporting link, in particular an electro-hydraulic or electrical link of the type known in automotive engineering.

The invention also concerns a control unit for a steered vehicle which, besides the usual front axle steering mechanism, has in particular a rear axle steering mechanism and alternatively or in addition can also be equipped with a torque-vectoring or active yaw control device that influences the yaw torque of the vehicle. The control unit is characterized in that at least as a function of vehicle parameters relating at least to the speed of the vehicle, the yaw rate, the acceleration and the wheel angle of each wheel, it can carry out interventions at the rear axle and/or the front axle in order to maintain the correct tracking of the vehicle by virtue of interventions at the front axle steering mechanism and/or rear axle steering mechanism, or by influencing the yaw torque, as described earlier in the context of the method.

Preferably, to keep the vehicle on course the control unit evaluates additional signals from a vehicle environment recognition system, in order to maintain the correct tracking. The vehicle environment recognition can take place by means of at least one sensor such as a camera, a radar or Lidar, or even supported by acceleration sensors (e.g. within the ESC/ESP sensor system).

Finally, the invention concerns a vehicle, particularly a motor vehicle, with at least front axle steering means and in particular rear axle steering means and/or means for steering by influencing the yaw torque of the vehicle, and a control unit as indicated above. While steering with the rear axle steering mechanism and/or by influencing the yaw torque by means of an active rear axle differential and/or by means of individual wheel motors and/or a driving dynamics regulating system (ESC/ESP), by means of the control system the front axle steering mechanism can be fixed at least temporarily, so that a wheel steering angle previously set at the front wheels can be maintained, at least temporarily. The torque on the front wheels produced by the restoring force due to the chassis kinematics can thereby be counteracted, so enabling effective steering by steering the rear wheels and/or by influencing the yaw torque.

The control system can be implemented in a separate control unit. Alternatively, it can also be implemented in the control units already present in the vehicle. In that case the sensors and control units are connected with one another by a bus system such as a CAN bus, or communicate with one another by way of such a system.

BRIEF DESCRIPTION OF THE DRAWINGS

Below, the invention is described with reference to preferred embodiments referring to the drawing, which shows.

DETAILED DESCRIPTION OF THE PREFERRED EMBODIMENTS

Figure 1:
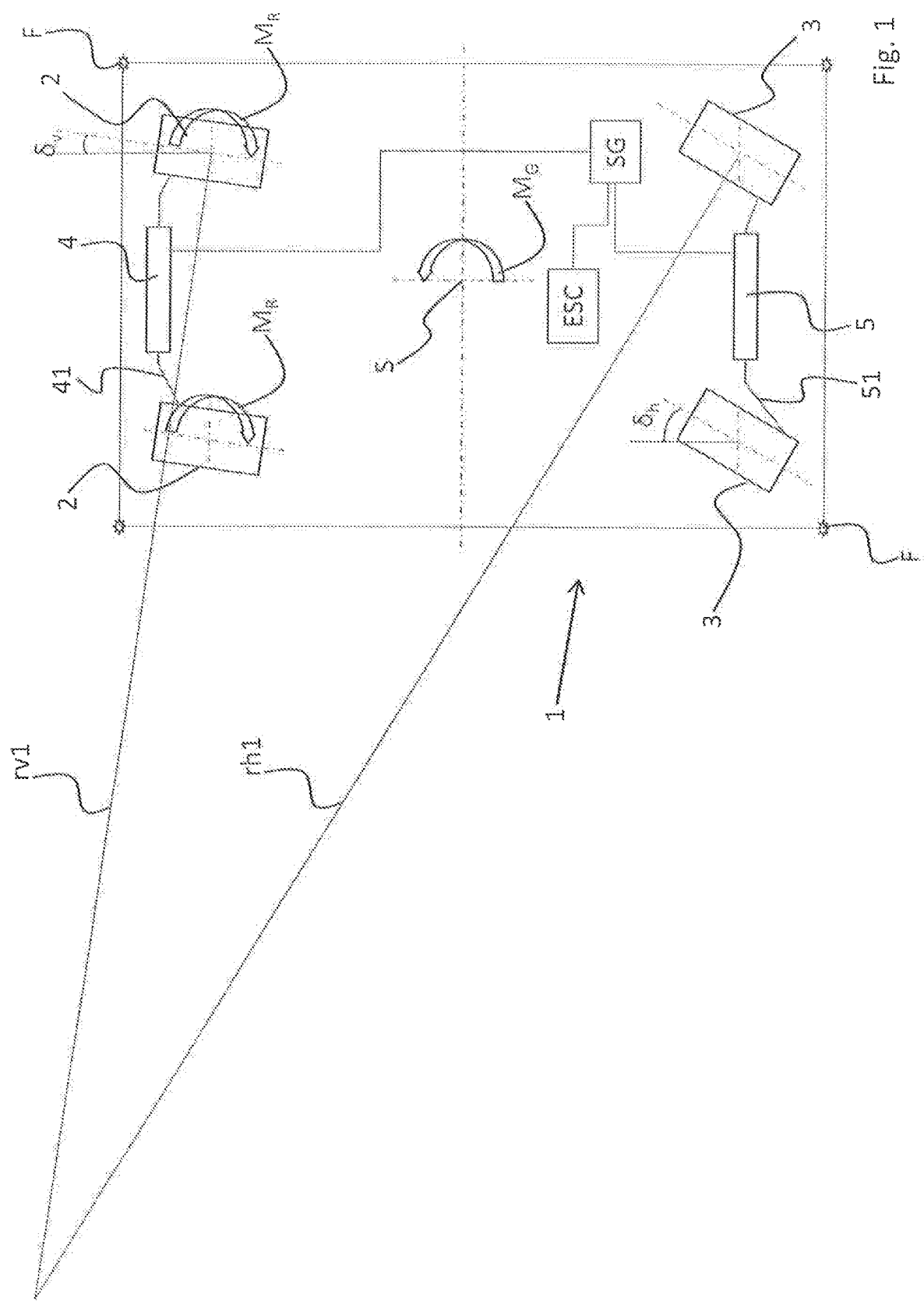
FIG. 1: A schematic representation of a vehicle, showing the influence of the restoring self-alignment torque on the front wheels.
Figure 2:
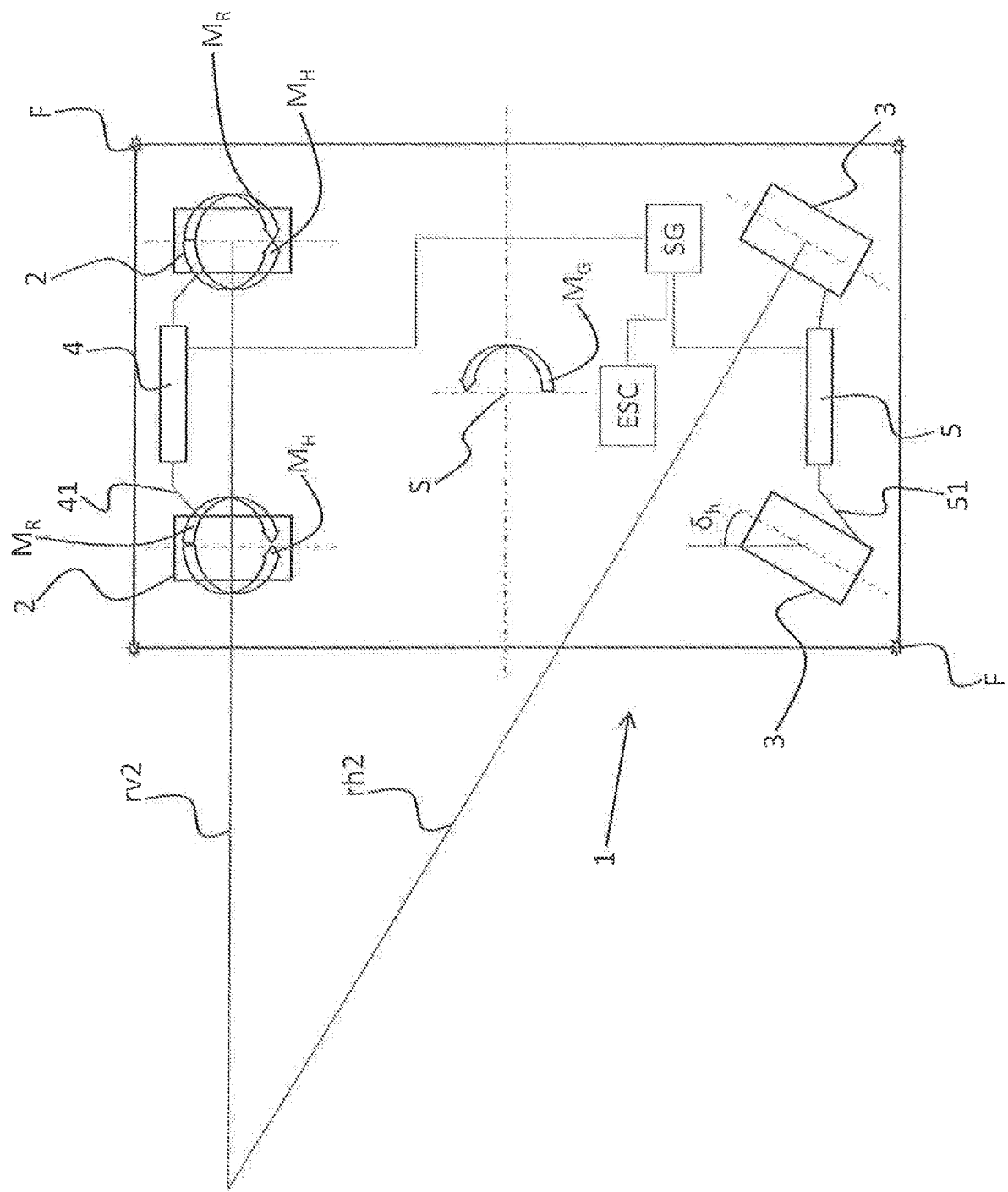
FIG. 2: A schematic representation of a vehicle with intentional suppression of the restoring self-alignment torque at the front wheels.

FIGS. 1 and 2 shown in each case a schematically represented vehicle 1 with two front steered wheels 2 and two rear steered wheels 3. The front wheels 2 and the rear wheels 3 are steered by the schematically represented steering mechanisms 4, 5 by means of a central actuator or a central force supporting mechanism. The respective wheels 2, 3 are linked by linkages 41, 51 such as the usual track rods, and control signals are sent by the control unit SG to the linkages. The front and rear axle steering mechanisms 4, 5 are kinematically independent of one another. In the middle of the vehicle 1 is the center of gravity S of the vehicle. By virtue of interventions at the front axle VA or the rear axle HA, such as the steering, braking or acceleration of individual wheels, a yaw torque $M_G$ is produced about the center of gravity S. The interventions take place as the result of signals from a control unit SG, which in the present case receives data from an ESC (Electronic Stability Program), such as vehicle speed, acceleration and yaw rate.

FIG. 1 shows the following situation: Due to a control signal from the control unit SG the rear wheels 3 have been steered to the right by the steering mechanism 5 via the track rods 51. At the rear axle, the rear wheels are deflected through a wheel steering angle of $\delta_h$. This has produced a yaw torque $M_G$, which acts on the vehicle 1 counterclockwise about the vertical axis or center of gravity S. Owing to this yaw torque $M_G$, due to the lateral force produced thereby the front wheels 2 have experienced a restoring self-alignment torque $M_R$, which brings about a change of the wheel steering angle $\delta_v$ in the same direction, to the right as shown here. The intentional steering angle correction applied by the control unit SG at the rear axle HA is therefore almost without effect, or at least of little efficacy.

FIG. 2 shows approximately the same situation, wherein the front wheels are held in position by the steering mechanism 4 in co-operation with the track rod system 41. In this temporary situation, i.e. during the intervention at the rear axle HA (a steering correction), which is carried out by the control unit SG by means of the steering mechanism 5 at the rear axle HA, the wheel steering angle $\delta_v$ currently set at the front axle VA remains unchanged.

By comparing FIGS. 1 and 2 the radii rv1 and rv2 and rh1 and rh2 indicated can also be seen. Here, the radii "rv" are perpendiculars extending from the wheel plane of the front wheels 2. The radii "rh" are perpendiculars extending from the wheel plane of the rear wheels 3. The radii "rv" and "rh" intersect at a point. It is evident that if the wheel steering angle $\delta_v$ in FIG. 1 is not maintained, a larger curve radius rv, rh is obtained than in FIG. 2, because in the latter case the wheel steering angle $\delta_v$ is maintained. For the sake of simplicity, the consideration of the curve radius rv, rh is limited to one track.

Below, as an example embodiment of the invention a driving maneuver with rear axle steering HA for correct tracking/maintaining the trajectory of a vehicle is described: The start of the deviation from the trajectory T required by the driver is detected by acceleration sensors and a driving environment recognition system F present in the vehicle 1, for example at least by means of a sensor such as a camera, radar or Lidar. A control unit SG evaluates the sensor signals and by means of a steering mechanism 5 a wheel steering angle $\delta_h$ is set at the rear wheels 3 (intervention at the rear axle), so that the trajectory T is maintained. At the same time, at the front axle steering mechanism VA, preferably at the steering wheel or at the front wheels 2, a torque $M_H$ is applied for the at least temporary maintenance of the wheel steering angle $\delta_v$ at the front wheels 2, so that effective action can take place by virtue of the intervention at the rear axle HA.

If such an intervention were not to be carried out at the front axle steering mechanism VA, then—caused kinematically due to the caster configuration—a restoration self-alignment of the front wheels would be produced, which would bring about a torque $M_R$ on the front wheels 2 which in the extreme case would be expressed as an oblique position of the vehicle 1, a so-termed "crabwise" motion (see FIG. 2). Despite the setting of a rear wheel steering angle $\delta_h$ the vehicle 1 would essentially continue following the set course T, i.e. straight ahead or—if driving round a bend—farther on the same curve radius rv, rh that corresponds to the currently set wheel steering angle $\delta_v$ of the front wheels 2. The effect of the intervention at the rear axle HA would be almost nothing, or only undesirably small.

Thus, in order to achieve the desired change of direction the front axle wheel steering angle $\delta_v$ must be temporarily maintained. Thus, the torque $M_H$ applied at the front axle steering mechanism 4 prevents the kinematic self-alignment of the front wheels 2, so that the steering wheel angle remains in the currently set position and for the driver there is no noticeable change. Alternatively to the torque produced, the intervention can also take place by means of a counterforce, with the same effect.

Alternatively to the torque or the counterforce, the intervention can also be effected by setting a defined wheel steering angle $\delta_v$ at the front axle linkage VA, preferably in that a movement or an angular position is set at the steering wheel, the steering linkage, the track rod or the wheels. In this way too the front axle steering mechanism VA can be decoupled from the effects of the rear axle steering mechanism HA.

It is understood that the above-mentioned features of the invention can be used not just in the combination indicated in each case, but also in other combinations or in isolation, without going beyond the scope of the invention.

INDEXES

1 Vehicle
2 Front wheels
3 Rear wheels
4 Front axle steering mechanism
41. Linkage
5 Rear axle steering mechanism
51. Linkage
rv Curve radius
rh Curve radius
S Center of gravity
VA Front axle
HA Rear axle
$M_G$ Yaw torque
$M_R$ Restoring, self-alignment torque
$M_H$ Holding torque
SG Control unit
ESC Electronic Stability Control
$\delta_v$ Front wheel steering angle
$\delta_h$ Rear wheel steering angle
F Vehicle environment recognition system
T Trajectory, path, driving lane

The invention claimed is:

1. A method of steering a motor vehicle having at least one front axle steering mechanism and a rear axle steering mechanism (5), the method comprising:
    carrying out interventions at a rear axle by adjusting a rear wheel steering angle of rear wheels and producing a yaw torque on the motor vehicle to maintain a desired trajectory of the motor vehicle; and
    as intervention are carried out at the rear axle, carrying out interventions at the front axle steering mechanism by fixing alignment of front wheels of the motor vehicle along a set front wheel steering angle and preventing a restoring self-alignment of the front wheels from the set front wheel steering angle.

2. The method according to claim 1, further comprising changing the rear wheel steering angle of the rear wheels by virtue of the interventions at the rear axle by actuating the rear axle steering mechanism.

3. The method according to claim 1, further comprising influencing, by virtue of the interventions at the rear axle, the yaw torque on the motor vehicle by applying at least one of drive torque and braking torque at the rear wheels with either an active rear axle differential or individual wheel drives.

4. The method according to claim 1, further comprising influencing, by virtue of the interventions at the rear axle, the yaw torque on the motor vehicle by changing a braking torque on the rear wheels with a driving dynamics regulation system.

5. The method according to claim 1, further comprising applying, by virtue of the interventions at the front axle steering mechanism, either a torque or a force to at least one of the front axle steering mechanism (4) and the front wheels which is counter to the restoring self-alignment of the front wheels.

6. The method according to claim 1, further comprising fixing the front wheels at the set front wheel steering angle with the front axle steering mechanism, by virtue of the interventions at the front axle steering mechanism.

7. The method according to claim 1, further comprising implementing the intervention at, at least one of the front axle steering mechanism and the rear axle steering mechanism, by one of:
   a superimposed steering system,
   an electric steering system (steer-by-wire),
   an electromechanical steering system, and
   an electro-hydraulic steering system.

8. The method according to claim 1, further comprising providing the motor vehicle with both a steerable front axle and a steerable rear axle, and a control unit that carries out at least one of the interventions at the rear wheels of the rear axle and interventions at the front wheels of the front axle, as a function of vehicle parameters relating to at least one of a vehicle speed, a yaw rate, an acceleration, a front wheel steering angle and the rear wheel steering angle of the front and the rear wheels, respectively, in order to maintain the motor vehicle on course.

9. The method according to claim 8, further comprising maintaining the motor vehicle on course by evaluating with the control unit additional signals from a vehicle environment recognition system in order to ensure that correct tracking of the motor vehicle is maintained.

10. A motor vehicle having a control unit, a front axle steering mechanism and a rear axle steering mechanism that facilitate steering of the motor vehicle at a front axle and at a rear axle, respectively,
   the control unit carrying out interventions at rear wheels of the rear axle and front wheels of the front axle, as a function of vehicle parameters relating to at least one of a vehicle speed, a yaw rate, an acceleration and wheel steering angles of the front and the rear wheels (2, 3), respectively, in order to maintain the motor vehicle on course, and
   the front axle steering mechanism being connected to the front wheels and controlled by the control unit to carry out interventions at the front wheels by fixing alignment of the front wheels at least temporarily at a set front wheel steering angle while interventions are carried out at the rear wheels by at least one of steering the rear wheels with the rear axle steering mechanism, and influencing a yaw torque of the motor vehicle by at least one of an active rear axle differential and a driving dynamics regulation system.

* * * * *